United States Patent
Burlowski

(10) Patent No.: US 7,266,781 B1
(45) Date of Patent: Sep. 4, 2007

(54) METHOD AND APPARATUS FOR GENERATING A GRAPHICAL DISPLAY REPORT

(75) Inventor: Timothy T. Burlowski, Lino Lakes, MN (US)

(73) Assignee: Veritas Operating Corporation, Mountain View, CA (US)

( * ) Notice: Subject to any disclaimer, the term of this patent is extended or adjusted under 35 U.S.C. 154(b) by 774 days.

(21) Appl. No.: 10/423,406

(22) Filed: Apr. 25, 2003

(51) Int. Cl.
*G06F 3/00* (2006.01)

(52) U.S. Cl. .................. 715/834; 715/821; 704/204

(58) Field of Classification Search .............. 715/834, 715/821, 804; 707/204
See application file for complete search history.

(56) References Cited

U.S. PATENT DOCUMENTS

| | | | |
|---|---|---|---|
| 5,798,760 A * | 8/1998 | Vayda et al. ............... 715/834 |
| 6,823,272 B2 * | 11/2004 | Sutton ............................ 702/58 |
| 6,944,655 B1 * | 9/2005 | Bellamy et al. ............ 709/223 |
| 7,036,093 B2 * | 4/2006 | Decombe ..................... 715/853 |
| 2002/0054117 A1 * | 5/2002 | van Dantzich et al. ..... 345/766 |
| 2003/0018657 A1 * | 1/2003 | Monday ..................... 707/204 |
| 2003/0061618 A1 * | 3/2003 | Horiuchi et al. .............. 725/87 |

* cited by examiner

*Primary Examiner*—Tadesse Hailu
*Assistant Examiner*—Dennis G. Bonshock
(74) *Attorney, Agent, or Firm*—Moser Law Group

(57) ABSTRACT

A method and apparatus for generating a graphical display report. The method includes representing a plurality of events as one or more icons; and positioning the icons inside two or more concentric circles defining at least an outer circle and an inner circle disposed inside the outer circle. The inner circle is configured to contain icons corresponding to events having a first status. The outer circle is configured to contain icons corresponding to events having a second status. The outer circle defines a plurality of tick marks disposed at a periphery of the outer circle, wherein the tick marks represent an attribute.

13 Claims, 6 Drawing Sheets

METHOD AND APPARATUS FOR GENERATING A GRAPHICAL DISPLAY REPORT

BACKGROUND OF THE INVENTION

1. Field of the Invention

Embodiments of the present invention generally relate to computer systems, and more particularly, to software for backing up data for computer systems.

2. Description of the Related Art

Backing up data for a computer system generally involves making a copy of that data, e.g., creating copies of that data in a database, another computer, disk, tape, and the like. The circumstances under which data is backed up are generally referred to as a session, a job or an event.

Often times, however, not all of the data is backed up properly, i.e., some are successfully backed up, some are partially backed up, and some are not backed up at all. Consequently, system administrators must continuously monitor and review the backup jobs. Today, most software packages that assist system administrators in monitoring and reviewing backup jobs lack the level of detail to enable system administrators to quickly and accurately identify potential and actual problem areas. For example, most software packages only provide a high level summary of the number of jobs that were completely successful, partially successful and that failed. These software packages do not provide system administrators with the details necessary to help them accurately analyze the system. Consequently, when a backup job fails, the system administrator has to wade through volumes of data associated with that particular backup job in order to determine the cause of the failure. Such a task may be physically taxing and time-consuming.

Therefore, a need exists for a method and apparatus for providing information in sufficient detail to allow system administrators to quickly and accurately identify potential and actual problem areas. A further need exists for quickly disseminating this information in a graphical report that enables system administrators to quickly and accurately analyze backup jobs.

SUMMARY OF THE INVENTION

The invention is generally directed to method of generating a graphical display report of events. The events are displayed as icons positioned inside a series of concentric circles. The icons may be represented as dots, clusters or arcs. The concentric circles include at least an outer circle and an inner circle positioned inside the outer circle. The inner circle is configured to contain icons corresponding to events having a first status. The outer circle is configured to contain icons corresponding to events having a second status. In one example, the events may be backup jobs, the inner circle may be configured to contain icons corresponding to backup jobs that have been successfully backed up, and the outer circle maybe configured to contain icons corresponding to backup jobs that have not been backed up. The concentric circles may further include a reference point. The icons may be positioned a number of degrees from the reference point. The number of degrees indicates an attribute. The attribute may indicate a time line, and the number of degrees may indicate the times on which the events occurred.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
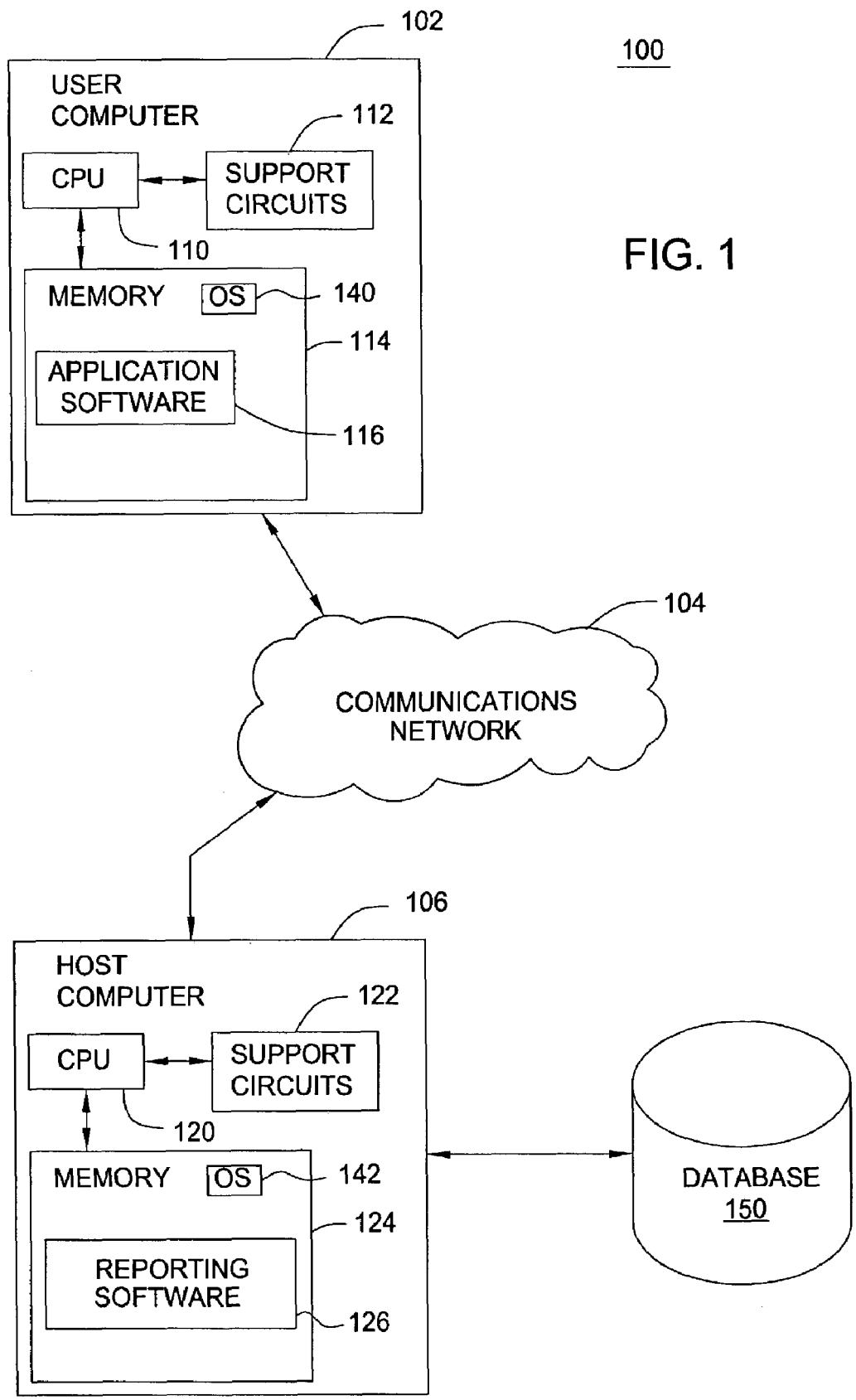
FIG. 1 illustrates a block diagram of a computer network that operates in accordance with one embodiment of the present invention.

FIG. 1 is a block diagram of a computer network 100 that operates in accordance with one embodiment of the present invention. The computer network 100 comprises at least one user computer 102, a host computer 106 and a database 150. Although the database 150 is depicted as being outside of the host computer 106, the database 150 may also be stored inside the host 106. The user computer 102 and the host computer 106 are interconnected by a communication network 104.

The user computer comprises a central processing unit (CPU) 110, support circuits 112, and memory 114. The support circuits 112 are well known circuits used to promote functionality of the CPU 110. Such circuits included but are not limited to cache, power supplies, clock circuits, input/output interface circuits, and the like. The memory 114 may comprise one or more of random access memory, read only memory, flash memory, removable disk storage, and the like. The memory 114 may store various software packages, such as application software 116 and operating system software 140.

The user computer 102 is connected to the communications network 104. The communication network 104 may be one of many types of networks such as a local area network, wide area network, wireless network, or combinations thereof.

The communications network 104 is connected to the host computer 106 to provide specific services to the user computer 102. For example, the host computer 106 may provide backup services to the user computer 102. The host computer 106 may be located at a remote location from the user computer 102 to facilitate security and redundancy of data. Other secure services provided by service provider computers may include a centralized file server, database services, and the like.

The host computer 106 comprises a CPU 120, support circuits 122, and memory 124. The support circuits 122 comprise well known circuits including, but not limited to, cache, power supplies, clocks, input/output circuits, and the like. The memory 124 comprises one or more of random access memory, read only memory, flash memory, removable disk storage and the like. The memory 124 stores operating system 142 and reporting software 126 that are executed by the CPU 120 to provide specific services to users through the user computer 102. As such, the host computer 106 generally operates as a general-purpose computer that performs a specific purpose when executing the reporting software 126. The reporting software 126 may be written in C++ and Java. Details of the operation of the reporting software 126 will be described with reference to FIGS. 5 and 6.

Figure 2:
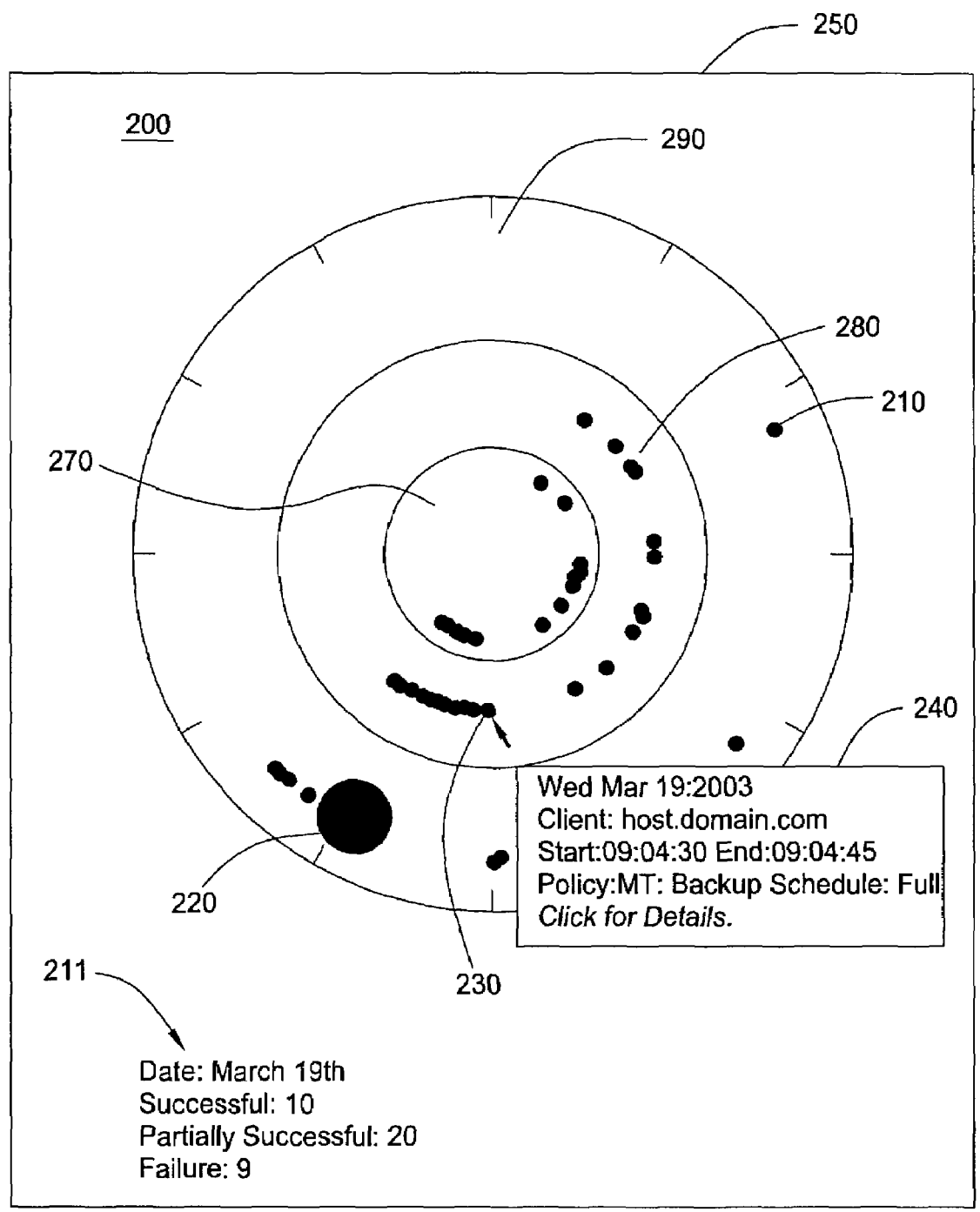
FIG. 2 illustrates a graphical display report in accordance with one embodiment of the invention.

In general, the reporting software 126 passively scans logs for specific information about each client, and copies that information into the database 150, then uses that data to generate reports on backup and restoration activities, catalog operations, and media usage. The reporting software 126 consolidates backup information into reports that allow a user, such as a system administrator, to quickly identify problem areas and potential problem areas. In particular, the reporting software 126 is configured to generate a graphical report in accordance with one embodiment of the invention. Rather than wading through volumes of data associated with backup jobs, the reporting software 126 presents the data in a graphical display such that the user may quickly analyze the backup jobs that occurred in a given period. FIG. 2 illustrates a graphical display report 200 on a screen 250 in accordance with one embodiment of the invention. The graphical display report 200 includes a series of concentric circles defining an inner circle 270, an intermediate circle 280 and an outer circle 290. Although three circles are shown, any number of circles may be contemplated by the invention. For example, instead of three concentric circles, the graphical display report 200 may include two concentric circles or four concentric circles. Each circle represents a status or an attribute. Backup jobs generally have three different statuses—completely successful, partially successful and failed. Accordingly, the outer circle 290 is configured to contain backup jobs that have failed, i.e., backup jobs in which the associated data have not been backed up. The intermediate circle 280 is configured to contain backup jobs that are partially successful, i.e., backup jobs in which the associated data have only been partially backed up. And, the inner circle 270, the bull's eye, is configured to contain backup jobs that are completely successful, i.e., backup jobs in which the associated data have successfully been backed up. However, other circular configurations may be contemplated by the invention. For example, the inner circle 270 may be configured to contain backup jobs that have failed, the intermediate circle 280 may be configured to contain backup jobs that have only been partially backed up, and the outer circle 290 may be configured to contain backup jobs that have been successfully backed up. Other geometrical forms other than circles may also be contemplated by the invention.

Although embodiments of the invention are being described with reference to generating a graphical display report of backup jobs, other events or instances may be contemplated. For example, reading or writing events to a file system from a disk may be plotted on the graphical display report 200. Inner circle 270 may be configured to contain successful reading or writing events, intermediate circle 280 may be configured to contain partially successful reading or writing events, and outer circle 290 may be configured to contain failed reading or writing events. Another example includes displaying failover of nodes in a cluster. Each circle may be configured to contain nodes in different physical machines.

Referring back to FIG. 2, in one embodiment, the outer circle 290 may be represented in red, the intermediate circle 280 may be represented in yellow and the inner circle 270 may be represented in green. However, other color combinations to represent the circles may be contemplated by the invention. For example, the outer circle 290 may be represented in green, the intermediate circle 280 may be represented in blue and the inner circle 270 may be represented in red. In another embodiment, the color of the backup job is indicative of the status of the backup job, as opposed to the position of the backup job. For example, backup jobs in red are indicative of backup jobs that have failed, backup jobs in yellow are indicative of backup jobs that have been partially backed up, and backup jobs in green are indicative of backup jobs that have been successfully backed up. The backup jobs may be positioned in a concentric circular configuration without displaying the concentric circles.

In accordance with another embodiment, each backup job is represented by an icon, such as a dot, an arc, and the like. For example, dot 210 is positioned in the outer circle 290, which indicates that the backup job represented by dot 210 has a failure status. The icons are generally small enough in size to enable the graphical display report 200 to contain substantially all the backup jobs in a given time period, such as, a twelve hour period, a twenty-four hour period and the like. In accordance with one embodiment of the invention, the outer circle 290 defines a plurality of tick marks on its periphery representing an attribute, such as, a time line, a sequence of geographical locations in a delivery route, and the like. The tick marks defined on outer circle 290 represent a timeline, and thus each icon is positioned inside a status circle according to the time, e.g., start time, on which the job occurred. In this manner, by looking at the position of the icon, the user may quickly determine substantially the start time of a backup job represented by the icon. For instance, in an embodiment in which the graphical display report 200 is arranged like a traditional twelve-hour clock, a backup job starting at 2:10 may be represented with dot 210 positioned ⅙ the distance of an arc between the 2:00 tick mark and the 3:00 tick mark. The tick marks on the outer circle 290 may be used to represent any form of timeline, such as a twenty-four hour period or a twelve-hour period with the 12:00 tick mark at the bottom and the 6:00 tick mark at the top, etc. In the twenty-four hour period time line, all the jobs that occur in a given day may be positioned inside the graphical display report 200, thereby expanding the amount of jobs that can be viewed at one time.

Figure 3:
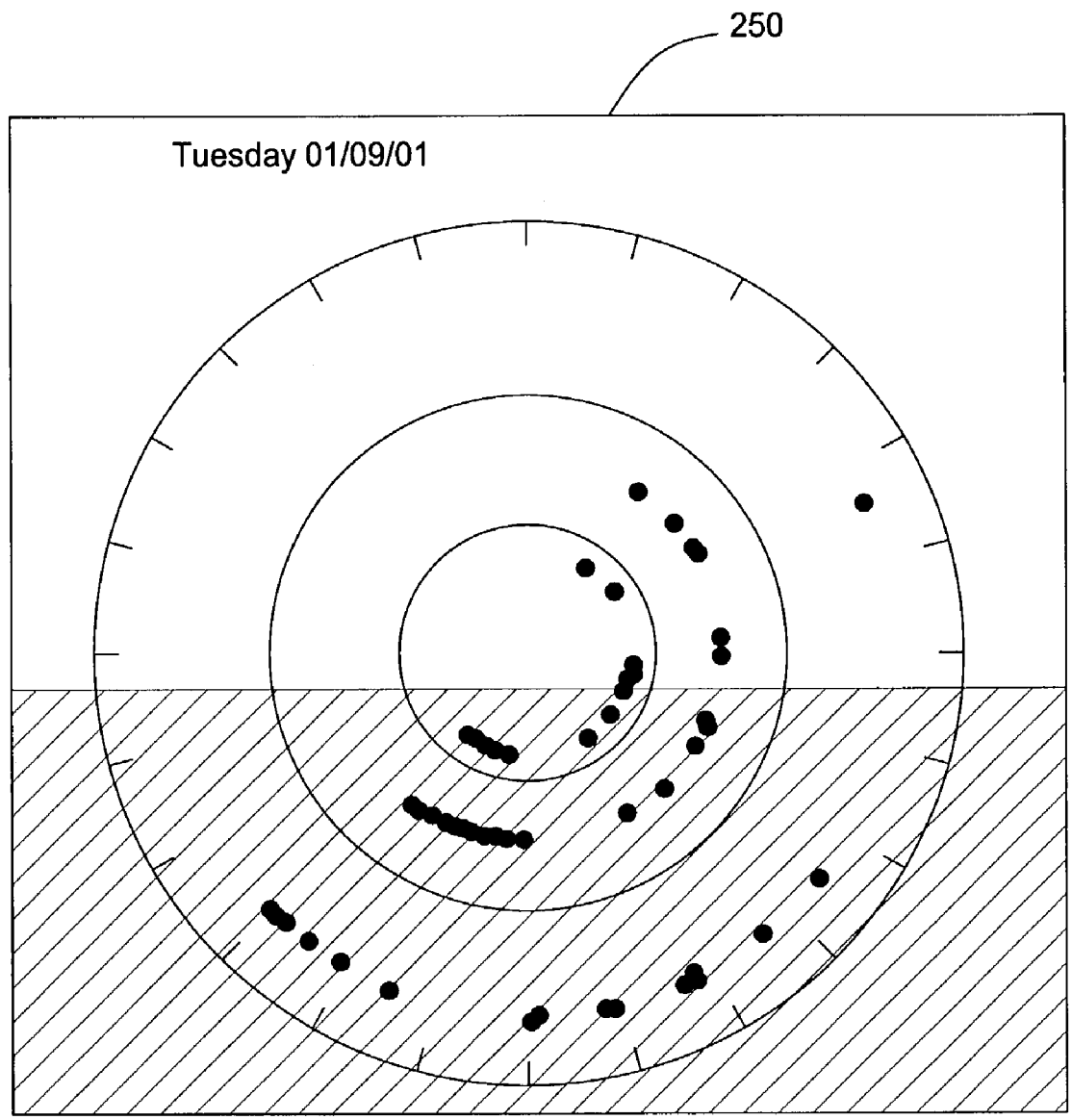
FIG. 3 illustrates a graphical display report in accordance with another embodiment of the invention.

In another embodiment, a gray transparent mask may be placed over a section of the graphical display report 200 to differentiate between backup jobs occurring in the nighttime from backup jobs occurring in the daytime (FIG. 3). In yet another embodiment, the graphical display report 200 may be configured to display all the backup jobs that occurred in more than a given day, such as a week, a month, etc.

In yet another embodiment, each backup job may be represented with an arc, with one end of the arc indicating the start time of the job and the other end of the arc representing the end time of the job. This embodiment is particularly helpful to identify jobs that have longer processing time. The arc may also cross status circular boundaries. For example, a backup job that started at 2:00 and failed at 2:15 may be restarted at 3:00 and was completely backed up at 4:00. This backup job may be represented by an arc starting in the outer circle 290, crossing the intermediate circle 280 and ending in the inner circle 270.

The graphical display report 200 may further illustrate (text region 211) meta information about the report 200, such as, the total number of backup jobs in each state for a given period. In this manner, the user may quickly determine the state, duration and timing of each backup job and the total number of backup jobs in each state for a given period.

If several backup jobs of the same status have substantially the same start time, those backup jobs may be represented with a larger icon, such as a dot cluster and the like. This representation may occur when the graphical representation of the number of backup jobs having substantially the same start time exceed the number of pixels available in a given area. For instance, all the backup jobs having start times around 7:00 are represented with a cluster 220 (FIG. 2). Like dot 210, cluster 220 is also positioned inside the outer circle, which indicates that each backup job represented by cluster 220 has a failure status.

In accordance with one embodiment of the invention, when the user places a mouse over the icon of interest, a pop-up window is displayed over screen 250. The pop-up window may contain detailed information about the backup job(s) represented by the icon. For instance, when a pointer (e.g., as controlled by a mouse, track-pad, track-ball and the like) is placed over dot 230, a pop-up window 240 is displayed on the screen 250. The pop-up window 240 may contain detailed information about the backup job represented by dot 230, such as, the date on which the backup job occurred, information about the client, the start time, the end time, and the policy and schedule under which the backup job is running. If the user selects the hyperlink "Click for details" at the bottom of the pop-up window 240, an additional information window may be displayed on screen 250. In one embodiment, this additional information may be a tabular report displayed on the screen 250, which contains detailed information associated with the backup job represented by dot 230. The tabular report may be commonly referred to as a client job history report.

Figure 4:
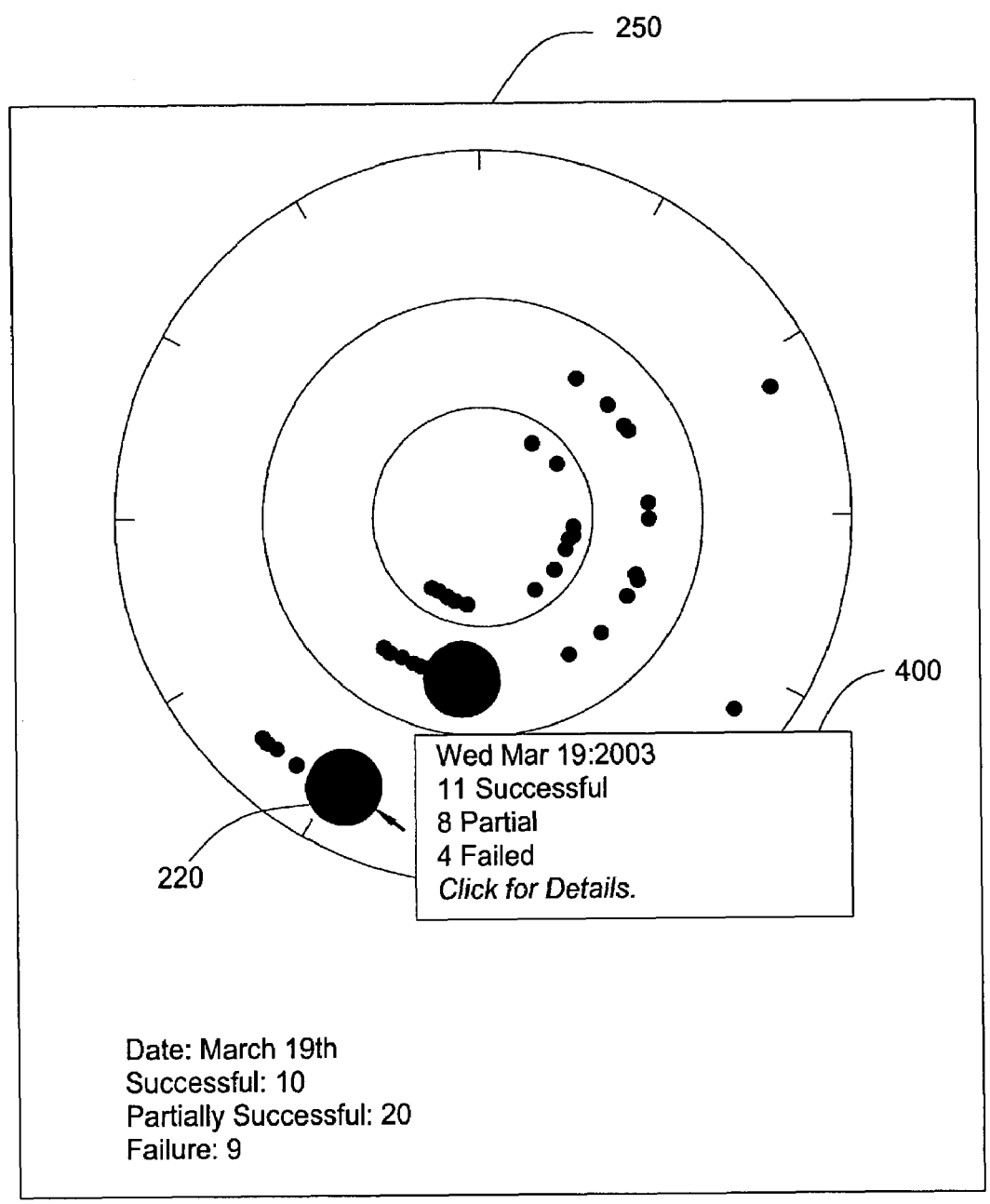
FIG. 4 illustrates a graphical display report with a pop-up window feature in accordance with another embodiment of the invention.

Similarly, when a mouse is placed over cluster 220, a pop-up window 400 may be displayed on screen 250 (FIG. 4). The pop-up window 400 may contain a summary of information about the backup jobs represented by cluster 220, such as, the date on which the backup jobs occurred, and the number of jobs that were successful, partially successful and failed. If the user selects the hyperlink "Click for detail" at the bottom of the pop-up window 400, an additional information window may be displayed on screen 250. In one embodiment, this additional information may be a tabular report displayed on the screen 250, which contains detailed information associated with the backup jobs represented by cluster 220.

Figure 5:
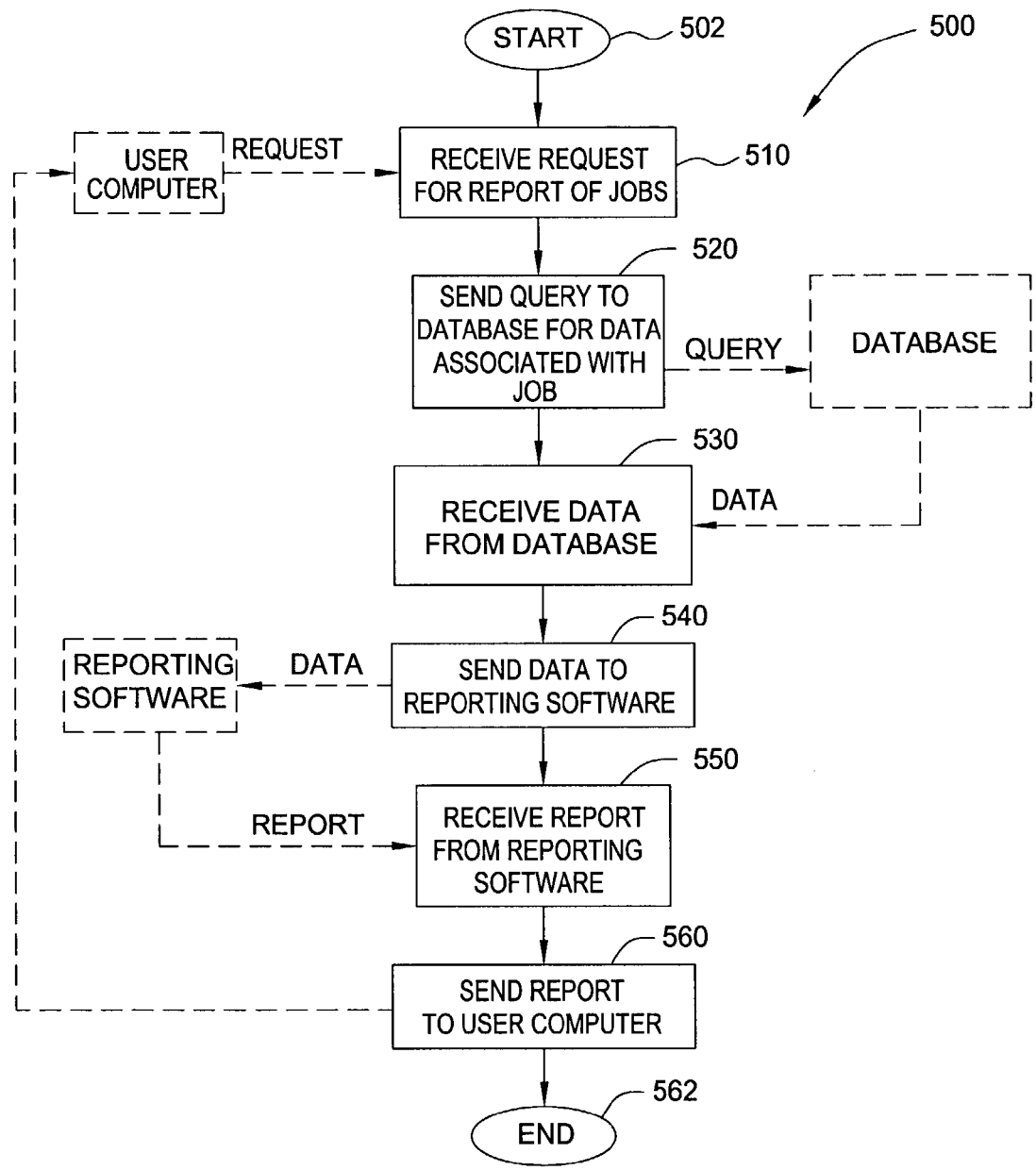
FIG. 5 illustrates a flow diagram of a method of generating a graphical report in accordance with one embodiment of the invention.

FIG. 5 illustrates a flow diagram of a method 500 of generating a graphical report 200 in accordance with one embodiment of the invention. In step 510, the host computer 106 receives a request from the user computer 102 to generate a report for all the backup jobs during a given period, e.g., the previous 12 hours. Upon receipt of the request, the host computer 106 sends a query to the database 150 to load the data associated with the backup jobs (step 520). In response, the host computer 106 receives the data for the backup jobs that have been gathered by the database 150 (step 530). At step 540, the host computer 106 sends the data to the reporting software 126. Such data may include the start time and the end time of each backup job, the information about the client, the policy and schedule under which the backup job is running, and the date on which the backup job occurred. Upon receipt of the data, the reporting software 126 processes the data and generates the graphical display report 200 in accordance with one embodiment of the invention. A more detailed description of the operation of the reporting software 126 in accordance with one embodiment of the invention will be described with reference to FIG. 6. At step 550, the host computer 106 receives the graphical display report from the reporting software 126. At step 560, the host computer 106 forwards the graphical display report to the user computer 102.

Figure 6:
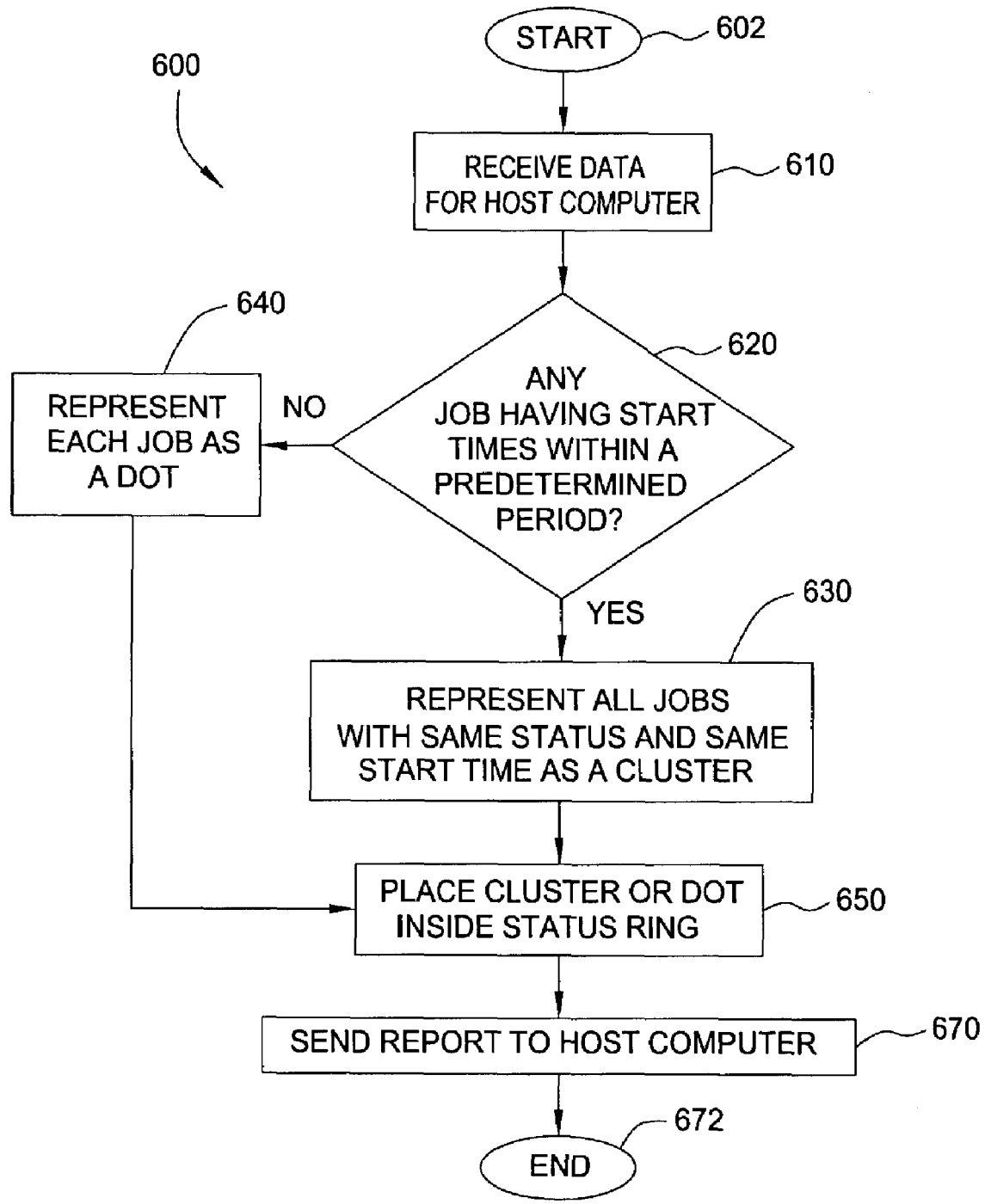
FIG. 6 illustrates a flow diagram of a method of generating a graphical display report in greater detail in accordance with one embodiment of the invention.

A detailed description of the operation of the reporting software 126 in accordance with one embodiment of the invention will now be described in the following paragraph. FIG. 6 illustrates in greater detail a flow diagram of a method 600 of generating a graphical display report. In step 610, the reporting software 126 receives the data associated with the backup jobs from the host computer 106. At step 620, a determination is made as to whether some of the backup jobs have the same status and have start times within a predetermined period, i.e., these backup jobs have substantially the same start times. If so, the reporting software 126 represents those jobs as one or more clusters, with each cluster representing backup jobs having the same status and substantially the same start time, at step 630. Processing then continues to step 650 where each cluster is positioned inside the status circle according to its status (i.e., completely successful, partially successful, or failed). Each status circle indicates the status of a backup job, as previously discussed above. If the answer to the query in step 620 is in the negative, then each backup job is represented as a dot (step 640). In step 650, the dot is positioned inside the status circle based on the backup job's status. Once each backup job has been represented as either a dot or part of a cluster, the graphical display report is sent to the host computer 106 (step 670).

While the foregoing is directed to embodiments of the present invention, other and further embodiments of the invention may be devised without departing from the basic scope thereof, and the scope thereof is determined by the claims that follow.

What is claimed is:

1. A method of generating a graphical display report, comprising: obtaining data associated with a plurality of backup jobs during a time period from a database;
   representing the plurality of backup jobs as one or more icons using the data;
   positioning the icons inside two or more concentric circles defining at least an outer circle and an inner circle disposed inside the outer circle, wherein the inner circle is configured to contain icons corresponding to backup jobs, having a first status, wherein the outer circle is configured to contain icons corresponding to backup jobs having a second status, wherein the concentric circles further define a reference point, and wherein perimeters of the concentric circles represent a time line and a number of degrees from which the icons are positioned indicates the times on which the backup jobs occurred; and
   wherein the inner circle is configured to contain icons corresponding to backup jobs that have been successfully backed up, and wherein the outer circle is configured to contain icons corresponding to backup jobs that have not been backed up.

2. The method of claim 1, wherein the concentric circles further defines an intermediate circle disposed between the inner circle and the outer circle, wherein the intermediate circle is configured to contain icons corresponding to backup jobs that have been partially backed up.

3. The method of claim 1, wherein the icons comprise at least one or more dots, clusters or arcs, wherein each dot or arc represents one of the backup jobs, and wherein each cluster represents the backup jobs having the same status and substantially the same attribute.

4. The method of claim 1, further comprising generating an image map information configured to display a pop-up window when a pointer is placed over one of the icons.

5. The method of claim 1, further comprising generating a hyperlink information configured to display a tabular report when the hyperlink is selected.

6. An apparatus for generating a graphical display report, comprising:
   means for obtaining data associated with a plurality of backup jobs during a time period from a database;
   means for representing the plurality of backup jobs as one or more icons using the data;
   means for positioning the icons inside two or more concentric circles defining at least an outer circle and an inner circle disposed inside the outer circle, wherein the inner circle is configured to contain icons corresponding to backup jobs having a first status, wherein the outer circle is configured to contain icons corresponding to backup jobs having a second status,
   wherein the concentric circles further define a reference point, and wherein perimeters of the concentric circles represent a time line and a number of degrees from which the icons are positioned indicates the times on which the backup jobs occurred; and
   wherein the inner circle is configured to contain icons corresponding to backup jobs that have been successfully backed up, and wherein the outer circle is configured to contain icons corresponding to backup jobs that have not been backed up.

7. A computer, comprising:
   a processor; and
   a memory comprising program instructions, wherein the program instructions are executable by the processor to:
   obtain data associated with a plurality of backup jobs during a time period from a database;
   represent a plurality of backup jobs as one or more icons using the data;
   positioning the icons inside two or more concentric circles defining at least an outer circle and an inner circle disposed inside the outer circle, wherein the inner circle is configured to contain icons corresponding to backup jobs having a first status, wherein the outer circle is configured to contain icons corresponding to backup jobs having a second status, wherein the concentric circles further, define a reference point, and perimeters of the concentric circles represent a time line and a number of degrees from which the icons are positioned indicates the times on which the backup jobs occurred; and
   wherein the inner circle is configured to contain icons corresponding to backup jobs that have been successfully backed up, and wherein the outer circle is configured to contain icons corresponding to backup jobs that have not been backed up.

8. The computer of claim 7, wherein the concentric circles further defines an intermediate circle disposed between the inner circle and the outer circle, wherein the intermediate circle is configured to contain icons corresponding to backup jobs that have been partially backed up.

9. The computer of claim 7, wherein the icons comprise one or more of dots, clusters or arcs, wherein each dot or arc represents one of the backup jobs, and wherein each cluster represents the backup jobs having the same status and substantially the same attribute.

10. A computer network, comprising:
    a user computer configured to send a request for a graphical display report of a plurality of backup jobs;
    a database configured to store data associated with the plurality of backup jobs; and
    a host computer comprising:
    a memory containing a graphical display reporting program; and
    a processor which, when executing the graphical display reporting program, performs an operation comprising:
    receiving the request from the user computer;
    sending a query to the database for the data associated with the plurality of backup jobs;
    receiving the data from the database;
    using the data to represent the plurality of backup jobs as one or more icons;
    positioning the icons inside two or more concentric circles defining at least an outer circle and an inner circle disposed inside the outer circle, wherein the inner circle is configured to contain icons corresponding to backup jobs having a first status, wherein the outer circle is configured to contain icons corresponding to backup jobs having a second status, wherein perimeters of the concentric circle represent a time line and a number of degrees from which the icons are positioned indicates the times on which the backup jobs occurred; and
    wherein the inner circle is configured to contain icons corresponding to backup jobs that have been successfully backed up, and wherein the outer circle is configured to contain icons corresponding to backup jobs that have not been backed up.

11. The computer network of claim 10, wherein the concentric circles further defines an intermediate circle disposed between the inner circle and the outer circle, wherein the intermediate circle is configured to contain icons corresponding to backup jobs that have been partially backed up.

12. The computer network of claim 10, wherein the icons comprise one or more dots, clusters or arcs, wherein each dot or arc represents one of the backup jobs, and wherein each cluster represents the backup jobs having the same status and substantially the same attribute.

13. The computer network of claim 10, further comprising generating an image map information configured to display a pop-up window when a pointer is placed over one of the icons.

* * * * *

UNITED STATES PATENT AND TRADEMARK OFFICE
CERTIFICATE OF CORRECTION

PATENT NO. : 7,266,781 B1  Page 1 of 1
APPLICATION NO. : 10/423406
DATED : September 4, 2007
INVENTOR(S) : Burlowski It is certified that error appears in the above-identified patent and that said Letters Patent is hereby corrected as shown below:

On the title page, item (74), in "Attorney Agent, or Firm", in column 2, line 1, after "Moser" insert -- IP --.

In column 5, line 46, delete "detail"" and insert -- details" --, therefor.

Signed and Sealed this

Twenty-ninth Day of April, 2008

JON W. DUDAS
*Director of the United States Patent and Trademark Office*